(12) United States Patent
Chung et al.

(10) Patent No.: US 7,915,988 B2
(45) Date of Patent: Mar. 29, 2011

(54) FIELD COIL ASSEMBLY OF ELECTROMAGNETIC CLUTCH FOR COMPRESSOR

(75) Inventors: Suk-Jae Chung, Daejeon (KR);
Sung-Taeg Oh, Daejeon (KR);
Deok-Soo Kim, Daejeon (KR);
Seong-Gyu Gong, Daejeon (KR)

(73) Assignee: Halla Climate Control Corp., Daejeon (KR)

( * ) Notice: Subject to any disclaimer, the term of this patent is extended or adjusted under 35 U.S.C. 154(b) by 0 days.

(21) Appl. No.: 12/362,601

(22) Filed: Jan. 30, 2009

(65) Prior Publication Data

US 2009/0243773 A1 Oct. 1, 2009

(30) Foreign Application Priority Data

Mar. 31, 2008 (KR) ........................ 10-2008-0029997

(51) Int. Cl.
*H01F 27/28* (2006.01)
(52) U.S. Cl. .................... 336/180; 336/221; 336/192
(58) Field of Classification Search .................. 336/220, 336/180, 221; 192/12 R, 12 D, 13 R, 13 A
See application file for complete search history.

(56) References Cited

U.S. PATENT DOCUMENTS

| | | |
|---|---|---|
| 2001/0025897 A1 | 10/2001 | Fulton et al. |
| 2003/0096522 A1 | 5/2003 | Fuju |
| 2006/0077026 A1 | 4/2006 | Chung |
| 2006/0145803 A1* | 7/2006 | Chung .......................... 336/192 |
| 2006/0201769 A1* | 9/2006 | Shimoyama et al. ..... 192/84.961 |
| 2008/0170952 A1* | 7/2008 | Jung ........................... 417/423.7 |
| 2010/0065397 A1* | 3/2010 | Oh ............................... 192/84.1 |

FOREIGN PATENT DOCUMENTS

KR 10-0784220 B1 12/2007

* cited by examiner

*Primary Examiner* — Anh T Mai
(74) *Attorney, Agent, or Firm* — Birch, Stewart, Kolasch & Birch, LLP

(57) ABSTRACT

The present invention relates to a field coil assembly of an electromagnetic clutch for a compressor. The present invention comprises a core 210, and a coil 240 installed to the core 210 and formed by winding a unit wire 250. At this time, the unit wire 250 wound on the coil 240 is made of aluminum, and an area ratio R of an inner sectional area M of the core 210 to a cross-sectional area of the unit wire 250 is 400 to 640. According to the present invention as above, since the unit wire 250 used for the coil 240 is made of aluminum with a small specific weight and low price rather than copper, the weight of the field coil assembly 200 is decreased to improve fuel efficiency of a vehicle and decrease a production cost of the field coil assembly 200.

4 Claims, 4 Drawing Sheets

M=H*W

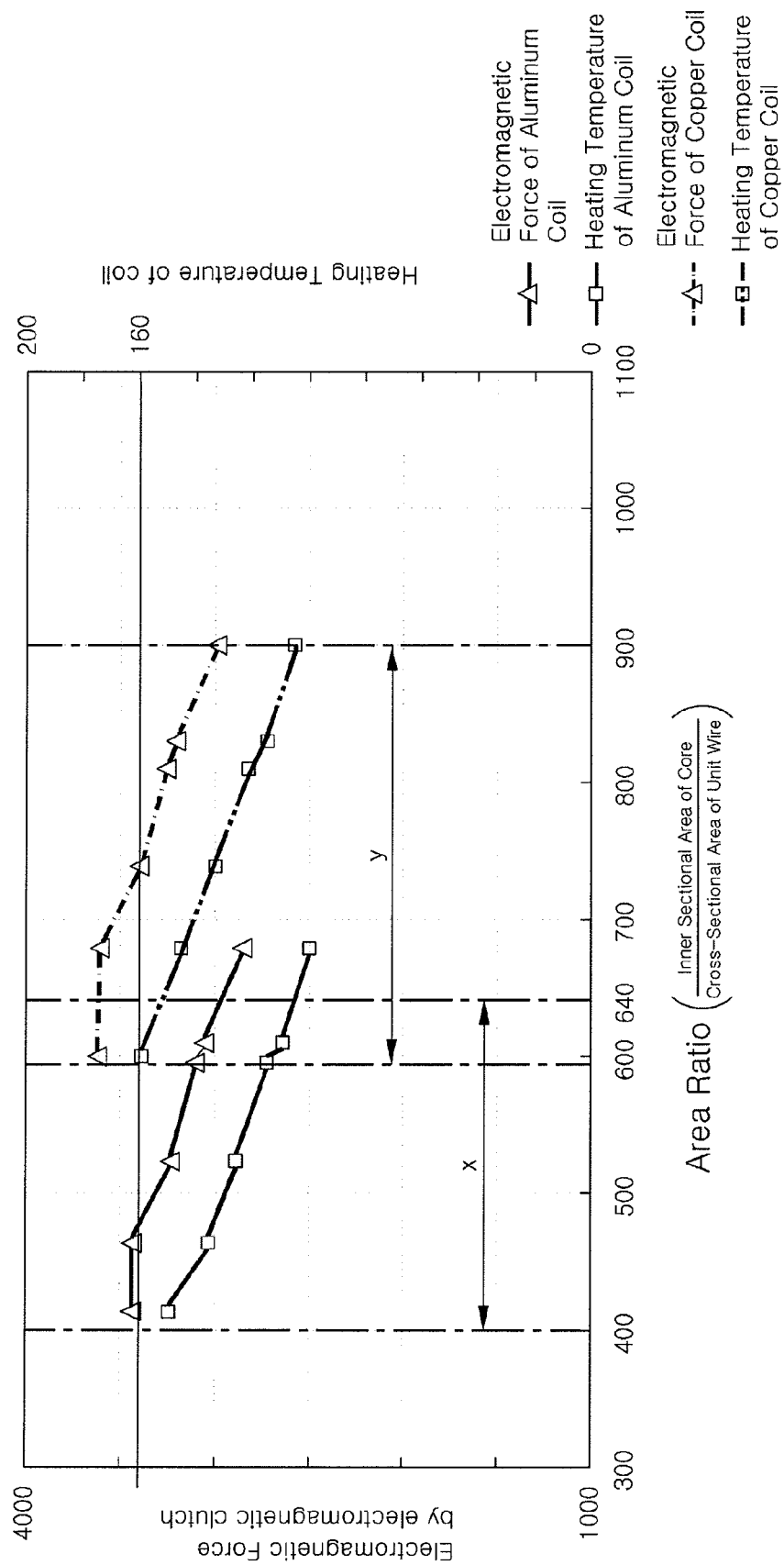

FIELD COIL ASSEMBLY OF ELECTROMAGNETIC CLUTCH FOR COMPRESSOR

BACKGROUND OF THE INVENTION

1. Field of the Invention

The present invention relates to an electromagnetic clutch for a compressor, and more particularly, to a field coil assembly having a coil made by winding an aluminum wire therein.

2. Description of the Related Art

Generally, an electromagnetic clutch for a compressor is an electric device, wherein a magnetic field is formed by electromagnetic induction of a coil made by winding a wire when power is supplied thereto and a resultant magnetic force causes a disc at a driving shaft of a compressor to be attracted toward a frictional surface of a pulley and to be dynamically connected thereto, whereby driving force of the pulley rotated by an engine is transmitted to the hub disc of the driving shaft of the compressor. The electromagnetic clutch for a compressor serves to control the operation of a cooling system of an air conditioner by regulating power of the compressor according to whether or not power is applied to the coil.

FIG. 1 is an exploded perspective view showing a general compressor and a coil assembly of an electromagnetic clutch for a compressor.

According to the figure, a general compressor includes a compressor body 1 for compressing and discharging a refrigerant, a pulley 3 connected to an engine and rotated, a field coil assembly 2 positioned between the pulley 3 and the compressor body 1 to generate electromagnetic force according to power supplied thereto, and a hub 4 connected to a driving shaft of the compressor body 1 and coupled to the pulley 3 by the electromagnetic force of the field coil assembly 2.

The compressor as configured above connects or disconnects the pulley 3 and the hub 4 using the power supplied to the field coil assembly 2 according to the manipulation of a user, thereby controlling power transmission of the compressor body 1.

If power is applied to the field coil assembly 2, an electric field made by a coil 2d of the field coil assembly 2 generates electromagnetic force, and the hub 4 is moved in an axial direction by the electromagnetic force and thus comes into contact with the pulley 3. Thereafter, the hub 4 and the pulley 3 rotate together by means of frictional force therebetween, so that rotational force of the pulley 3 is transmitted to the hub 4.

Accordingly, the compressor body 1 whose the driving shaft is coupled to the hub 4 operates, and then, a refrigerant is compressed and discharged as the compressor body 1 operates. If the power applied to the field coil assembly 2 is cut off, the electromagnetic force is not generated. Thus, the hub 4 and the pulley 3 are disconnected from each other, whereby the compressor body also stops.

The conventional field coil assembly 2 of an electromagnetic clutch for a compressor has its external appearance and framework defined by a core 2a, as shown in the figure. A connector 2b is provided on the core 2a to give an electric connection to the outside and also be supplied with power.

In addition, a bobbin 2c is provided in the core 2a, and the bobbin 2c is provided with a terminal 2c' connected to the connector 2b.

The bobbin 2c is provided with a coil 2d. The coil 2d is formed by winding a wire, wherein lead wires (not shown) for connecting with the terminal 2c' are provided at one side of the coil.

The bobbin 2c is provided with a fixing cover 2f. The fixing cover 2f is coupled to the bobbin 2c to support the coil 2d.

However, the above related art has the following problems.

The wire is generally made of a copper material. However, copper has a relatively high specific weight of 8.96, which increases the entire weight of the field coil assembly 2, thereby deteriorating a fuel efficiency of a vehicle. Also, copper is relatively expensive, thereby increasing a production cost of the field coil assembly 2.

To solve this problem, the wire can be made of aluminum with a relatively low specific weight (2.7). However, since aluminum has a relatively higher inherent resistance than copper, when an aluminum wire with the same diameter is used, the efficiency of the field coil assembly 2 is deteriorated and the coil may be easily heated.

SUMMARY OF THE INVENTION

The present invention is conceived to solve the aforementioned problems in the related art. An object of the present invention is to provide a field coil assembly, in which an aluminum wire having a diameter optimally calculated in consideration of an inner sectional area of a core is wound to make a coil.

According to an aspect of the present invention for achieving the objects, there is provided a field coil assembly of an electromagnetic clutch for a compressor, which comprises a core; and a coil installed to the core and formed by winding a unit wire, wherein the unit wire is made of aluminum, and an area ratio of an inner sectional area of the core to a cross-sectional area of the unit wire is 400 to 640.

The unit wire may have a diameter of 0.65 mm to 0.95 mm.

The core may further comprise therein a bobbin having a terminal at one side thereof, and a fixing cover coupled to the bobbin to support the coil.

A bobbin having a terminal provided at one side thereof may be provided inside of the core, and the bobbin is molded in the core using epoxy or resin.

The aluminum of the unit wire may have a degree of purity of 99.0% or above.

BRIEF DESCRIPTION OF THE DRAWINGS

The features and advantages of the present invention will become apparent from the following descriptions given in conjunction with the accompanying drawings, in which:

FIG. 5 is a graph showing one example of a heating temperature value and a measured force value of an aluminum coil according to a ratio of a cross-sectional area of a wire to an inner sectional area of a core in the field coil assembly of an electromagnetic clutch for a compressor according to the embodiment of the present invention, in comparison with a copper coil.

DESCRIPTION OF THE PREFERRED EMBODIMENT

Hereinafter, a preferred embodiment of a field coil assembly of an electromagnetic clutch for a compressor according to the present invention will be described in detail with reference to the accompanying drawings.

Figure 1:
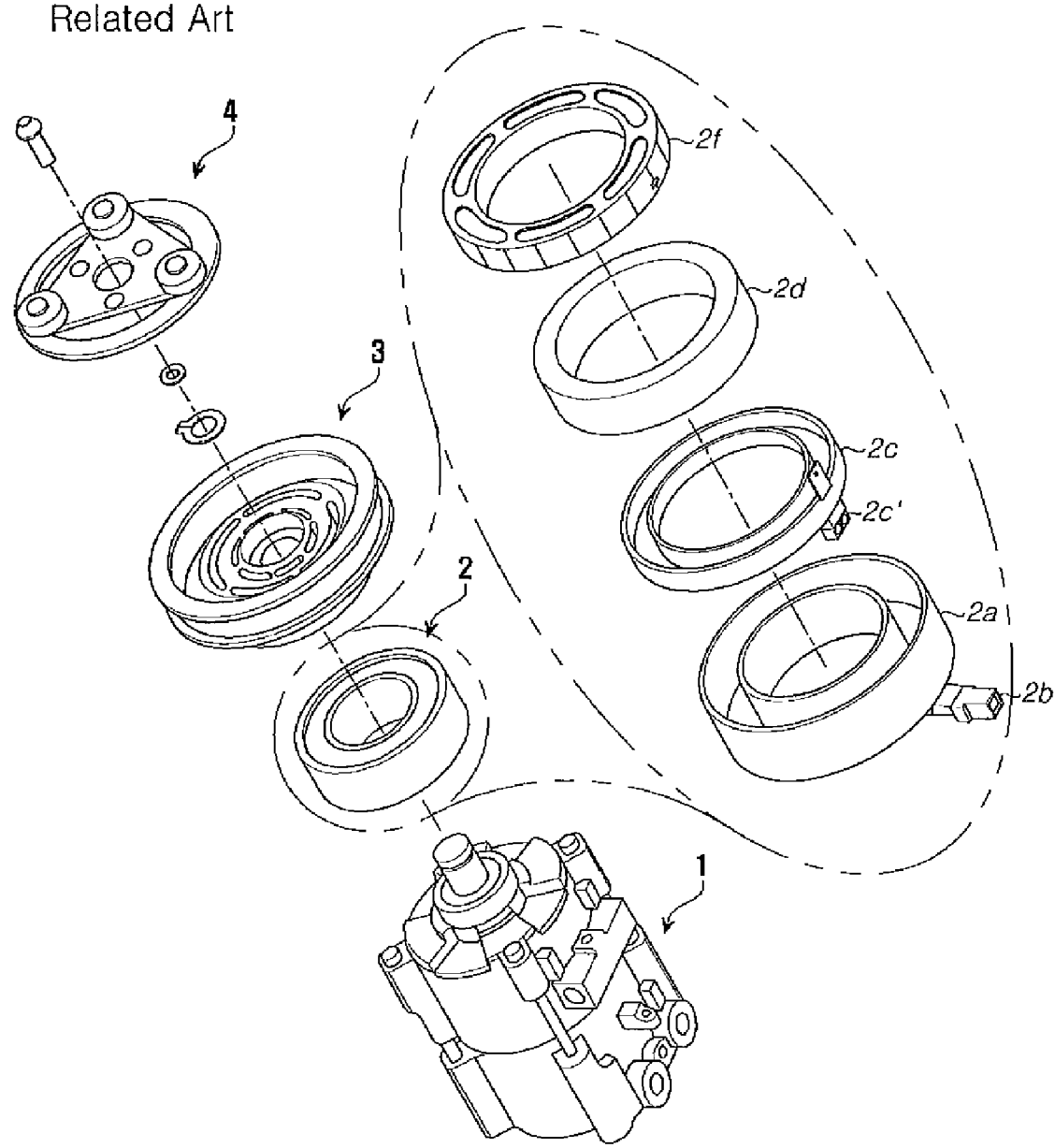
FIG. 1 is an exploded perspective view showing a general compressor and a field coil assembly of an electromagnetic clutch for a compressor.
Figure 2:
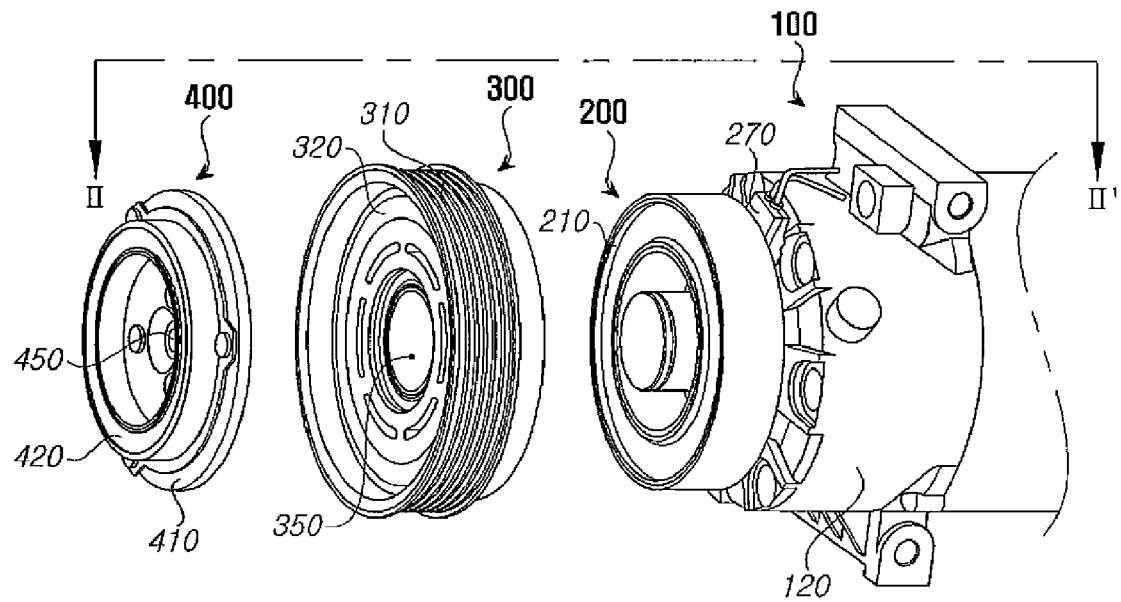
FIG. 2 is an exploded perspective view showing a compressor in which a field coil assembly of an electromagnetic clutch for a compressor according to a preferred embodiment of the present invention is employed.
Figure 3:
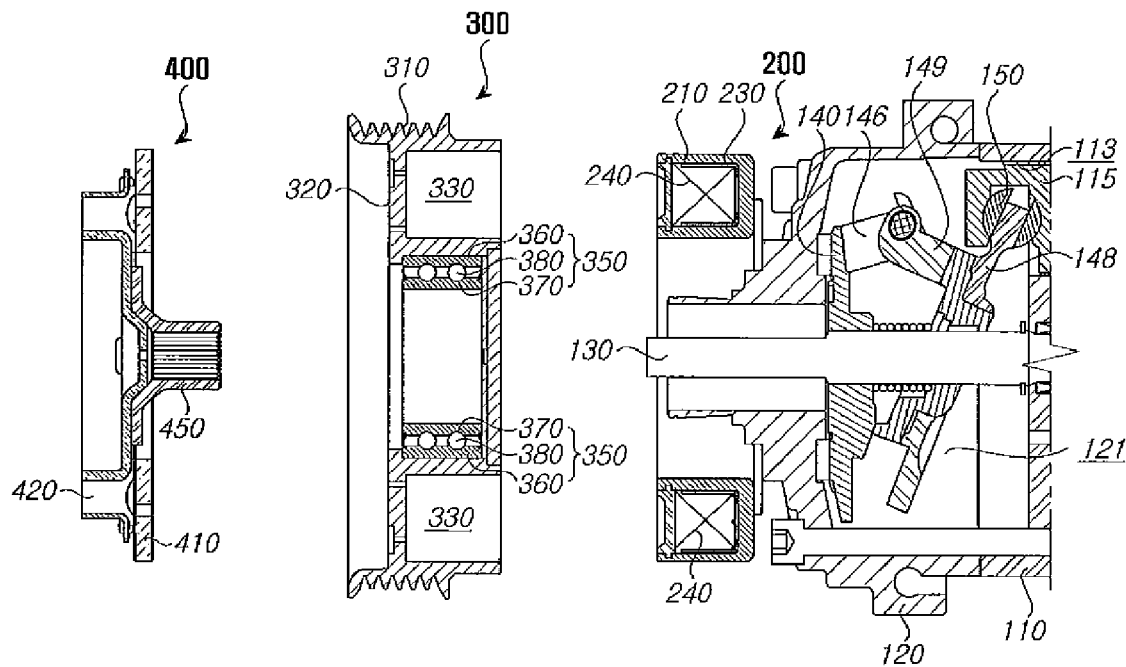
FIG. 3 is a sectional view taken along line II-II' of FIG. 2.
Figure 4:
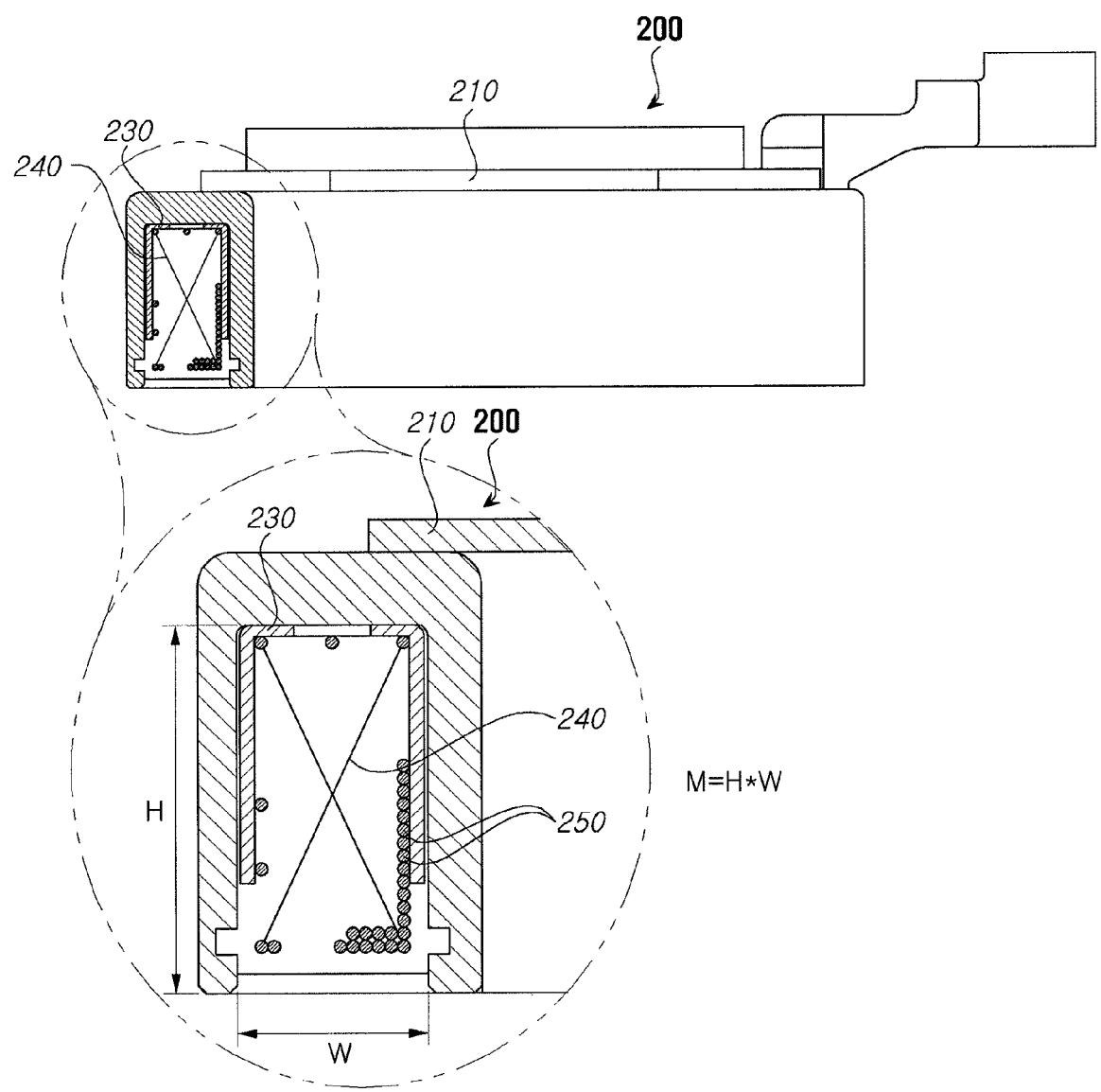
FIG. 4 is a sectional view showing a major portion of the field coil assembly of an electromagnetic clutch for a compressor according to the embodiment of the present invention.

FIG. 2 is an exploded perspective view showing a compressor in which a field coil assembly of an electromagnetic clutch for a compressor according to a preferred embodiment of the present invention is employed, FIG. 3 is a sectional view taken along line II-II' of FIG. 2, FIG. 4 is a sectional view showing a portion of the field coil assembly of an electromagnetic clutch for a compressor according to the present invention, and FIG. 5 is a graph showing one example of a heating temperature value and a measured force value of an aluminum coil according to a ratio of a cross-sectional area of a wire to an inner sectional area of a core in the field coil assembly of an electromagnetic clutch for a compressor according to the embodiment of the present invention, in comparison with a copper coil.

First of all, a compressor 100 will be described. As shown in FIG. 3, the compressor 100 is provided with a cylinder block 110. The cylinder block 110 partially defines an external appearance and framework of the compressor 100. A plurality of cylinder bores 113 are formed in the cylinder block 110. Piston 115 is installed in the cylinder bore 113 to be capable of linearly reciprocating therein, respectively.

The piston 115 has a cylindrical shape, and the cylinder bore 113 also has a cylindrical shape corresponding thereto. The piston 115 linearly reciprocates in the cylinder bore 113 and compresses a refrigerant in the cylinder bore 113.

The piston 115 is positioned at a top dead center and a bottom dead center in turn while linearly reciprocating in the cylinder bore 113. When the piston 115 is positioned at the bottom dead center, an outer surface of the piston 115 is partially exposed to the outside of the cylinder bore 113. When the piston 115 is positioned at the top dead center, the piston 115 is put into the cylinder bore 113 again and comes into contact with an inner surface of the cylinder bore 113.

A front housing 120 is installed at one end of the cylinder block 110. The front housing 120 is concave at a side facing the cylinder block 110, thereby defining a crankcase 121 therein together with the cylinder block 110. The crankcase 121 is airtightly sealed from the outside.

A rear housing (not shown) is installed at the other end of the cylinder block 110, namely at a side opposite to the front housing 120. The rear housing is provided with a suction chamber (not shown) and a discharge chamber (not shown), which communicate with the cylinder bore 113, and supplies a refrigerant into the cylinder bore 113 and discharges the refrigerant from the inside of the cylinder bore 113, respectively.

A driving shaft 130 is installed across the cylinder block 110. The driving shaft 130 is rotated by the driving force transmitted from an engine. One end of the driving shaft 130 protrudes toward a hub 450 of a disc assembly 400, which will be described later.

Reference numeral 140 designates a rotor. The rotor 140 is installed to the crankcase 121 such that the driving shaft 130 passes through a center of the rotor 140 and also the rotor 140 is rotated together with the driving shaft 130. The rotor 140 has a substantially disc shape, and is fixedly installed to the driving shaft 130. A hinge arm 146 is formed to protrude on one surface of the rotor 140.

A swash plate 148 is installed to the driving shaft 130 such that the swash plate 148 is hinged to the hinge arm 146 of the rotor 140 and thus rotated together. The swash plate 148 is installed to the driving shaft 130 such that the angle of the swash plate can vary. The swash plate 148 is positioned between a state orthogonal to a lengthwise direction of the driving shaft 130 and a state inclined at a predetermined angle with respect to the driving shaft 130. Reference numeral 149 designates a connection arm connected to the hinge arm 146.

The swash plate 148 has an edge connected to the pistons 115 through shoes 150. That is, the edge of the swash plate 148 is connected to one side of the piston 115 through the shoe 150 such that the piston 115 linearly reciprocate in the cylinder bore 113 by the rotation of the swash plate 148.

Now, an electromagnetic clutch will be explained. The electromagnetic clutch includes a field coil assembly 200, a pulley 300 and a disc assembly 400. Hereinafter, these components will be described in order.

The field coil assembly 200 generates electromagnetic force so that the disc assembly 400 is moved toward the pulley 300. That is, the electromagnetic force of the field coil assembly 200 causes the disc assembly 400 to be moved toward the pulley 300, so that the disc assembly 400 is rotated together with the pulley.

A bobbin 230 is installed to a core 210 that defines an external appearance and framework of the field coil assembly 200, and the bobbin 230 is provided with a coil 240. In addition, a fixing cover (not shown) is coupled to the bobbin 230 with the coil 240 interposed therebetween, thereby supporting the coil 240. At this time, the bobbin 230 and the fixing cover may be integrally formed with the core 210 or omitted, instead of being configured as separate parts.

At this time, the bobbin 230 is molded in the core 210 using epoxy resin or other resins and fixed therein. It allows the bobbin 230 to be firmly fixed in the core 210 without any additional fixture.

Meanwhile, an inner sectional shape of the core 210 is not limited to a rectangular shape, but may be circular, elliptical or other polygonal shapes.

The coil 240 has a unit wire 250 (hereinafter, referred to as a 'wire') repeatedly wound therein, and has a substantially ring shape. Two ends of the wire 250 respectively protrude at one side of the coil 240 to form lead wires (not shown). The lead wires are used for connection to terminals (not shown) formed in the bobbin 230. Reference numeral 270 designates a connector in which the terminal is housed.

As shown in FIG. 4, the wire 250 has a substantially circular cross sectional shape, and is made of an aluminum material with good electric conductivity. Since the aluminum wire 250 has a very small specific weight in comparison with copper or other metals, it is possible to decrease an entire weight of the field coil assembly 200. More specifically, the aluminum has a specific weight of 2.7, which is only 30% of copper of which the specific weight is 8.96.

The coil 240 is received inside of the core 210, so that as shown in FIG. 4, the sectional area of the coil 240 should correspond to an inner sectional area M of the core 210. At this time, since the coil 240 is configured by winding the wire 250, the sectional area of the coil 240 corresponding to the inner sectional area M of the core 210 is determined by the number of turns of the wire 250 and the cross-sectional area of the wire 250. More specifically, a value obtained by multiplying the number of turns of the wire 250 by the cross-sectional area of the wire 250 becomes a magnitude of the sectional area of the core 210. (At this time, it would be understood that the cross-sectional area of the wire 250 is $(D/2)^2 * \pi$ from the diameter D of the wire 250)

Accordingly, if the magnitude of the inner sectional area M of the core 210 is determined, the sectional area of the coil 240 receivable therein is also determined constantly, so that the number of turns of the wire 250 is in reverse proportion to the cross-sectional area of the wire 250.

At this time, the magnitude of the cross-sectional area of the wire 250 is directly related to a heating temperature of the coil 240 and the performance of the field coil assembly 200, namely the electromagnetic force of the electromagnetic clutch, so that it should be suitably set. In other words, the magnitude of the cross-sectional area of the wire 250 should be set such that the electromagnetic force of the electromagnetic clutch is kept over a certain value and the heating temperature of the coil 240 is kept below a certain value.

More specifically, the electromagnetic force of the electromagnetic clutch and the heating of the coil 240 are related to force of electricity, namely electric power, and it would be understood that the magnitude of electric power is greatly influenced by current rather than resistance from the equation "P=VI=I$^2$*R". Also, since the voltage is calculated from the equation "V=IR", on the assumption that voltage is constant, the current has a greater value as resistance is smaller. As a result, the electromagnetic force of the electromagnetic clutch and the heating of the coil 240 are increased as current flowing on the wire 250 is greater, and it is determined by the magnitude of the cross-sectional area of the wire 250, namely its diameter D.

The electromagnetic force of the electromagnetic clutch and the heating value of the coil 240 according to the diameter D of the wire 250 and the number of turns of the wire 250 are shown in FIG. 5 as a graph. In the graph, the horizontal axis represents an area ratio R of the inner sectional area M of the core 210 to the cross-sectional area of the wire 250 of the coil 240, and the vertical axis represents the electromagnetic force of the electromagnetic clutch and the heating temperature of the coil 240, respectively. From the graph, it would be understood that the electromagnetic force and the heating temperature are decreased as the number of turns of the wire 250 is increased, namely as the diameter D of the wire 250 is reduced. At this time, since it is preferred that the electromagnetic force be greater and the heating temperature be lower, it is required to suitably set the ranges of the electromagnetic force of the electromagnetic clutch and the heating of the coil 240.

It could be understood from the experiments that the electromagnetic force of the electromagnetic clutch and the heating of the coil 240 are optimum in performance when the area ratio R, i.e., a ratio of the inner sectional area M of the core 210 to the cross-sectional area of the wire 250 of the coil 240 is 400 to 640 (a region x in the graph in FIG. 5). It is an experimental value obtained by reflecting electric resistance of an aluminum material.

More specifically, an aluminum material has an electric resistance of 0.028Ω, which is relatively greater than that of a copper material, i.e., 0.017Ω, so that the aluminum wire 250 of the coil 240 allows a relatively smaller amount of current to flow therethrough in comparison with a copper wire.

Accordingly, in order to obtain the same performance as a coil made of a copper material, the wire 250 of the aluminum coil 240 should have a greater diameter than the conventional copper wire, and the area ratio R should also be changed suitably. That is, as seen from FIG. 5, while a copper coil exhibits desired electromagnetic force and heating temperature when an area ratio is 600 to 900 (a region y of the graph), the aluminum coil 240 exhibits desired electromagnetic force and heating temperature when an area ratio R is 400 to 640. For reference, an allowable limit of the heating temperature is 160° C., so that the electromagnetic force of the coil 240 is also limited accordingly.

The meaning of the aforementioned numerical limitation will be described in more detail. When the area ratio R is 400 or less, the heating temperature of the coil exceeds the allowable limit (160° C.). Thus, a molding material applied to the wire of the coil is melted, or a fuse is short-circuited, which causes misoperation of the electronic clutch. Further, the heat from the coil is transferred to a bearing provided adjacent to the coil, which causes the bearing to be stuck and thus the electronic clutch not to operate smoothly.

On the contrary, if the area ratio R is 640 or more, the electromagnetic force of the coil is reduced. Accordingly, a disk 410, which will be described later, is not brought into close contact with a frictional surface 320 of the pulley 300, or is brought into close contact therewith with time delay, which causes the slip between the disk 410 and the frictional surface 320 of the pulley 300. In addition, if the disk 410 is not brought into fully close contact with the pulley 300, there is a problem in that driving force of an engine is not smoothly transmitted to the compressor.

An equation for calculating a desirable diameter of the wire 250 using the area ratio R and the inner sectional area M of the core 210 will be derived. Since the inner sectional area M of the core 210 is a given value and the area ratio R can be obtained from the experimental value, the diameter of the wire 250 can be calculated using the above.

It may be expressed as the following equation:

$$\frac{M}{(D/2)^2 \times \pi} = R.$$

Here, M is an inner sectional area of the core 210, D is a diameter of the wire 250, and R is a ratio of the inner sectional area M of the core 210 to the cross-sectional area of the wire 250. Thus, since M is a given value and R is 400 to 640 obtained from the above experiment, the diameter D of the wire 250 can be calculated. Then, if the cross section of the core 210 has a rectangular shape as shown in FIG. 4, the sectional area M thereof can be obtained by multiplying a height H by a base W.

If arranging the above equation, the diameter D of the wire 250 can be expressed as follows:

$$D = a \times \sqrt{\frac{M}{R}}.$$

At this time, it would be understood that a is as follows:

$$a = \frac{2}{\sqrt{\pi}}.$$

Here, the diameter D of the wire 250 is preferably set within a range from 0.65 mm to 0.95 mm. Since the aluminum wire 250 has a generally greater diameter than a copper wire having a diameter of 0.5 mm to 0.7 mm, the coil 240 may possess the same performance as a conventional copper coil in terms of the heating temperature and the electromagnetic force.

If the diameter D of the wire 250 is suitably calculated as mentioned above, aluminum material is drawn to make the wire 250, and then it is wound to make the coil 240. At this time, since the inner sectional area M of the core 210 is determined depending on design specifications and a location, such as the inside of a vehicle, where the electromagnetic clutch for a compressor is installed, a designer may easily calculate the diameter D of the wire 250 using the aforementioned equations.

The aluminum wire 250 as mentioned above has a greatly low specific weight in comparison with other metals having good electric conductivity such as copper, so that it is possible to make a lighter field coil assembly 200 of an electromagnetic clutch for a compressor.

At this time, the wire 250 is preferably made of aluminum with a degree of purity of 99.0% or above. This is because if the degree of purity of the aluminum is lowered, resistance caused by impurities (e.g., Si, Fe, Cu, Ti and Mn) is increased and the heating of the wire 250 is increased. The heating of the wire 250 may be solved by increasing the diameter D of the wire 250, but if the diameter D of the wire 250 is increased, the size of the core 210 is resultantly increased and thus the volume of the field coil assembly 200 is disadvantageously increased.

In addition, if the degree of purity of the aluminum is lowered, there may be a loss in the electromagnetic force generated by the coil 240, which may deteriorate the performance of the field coil assembly 200. Thus, the wire 250 is preferably made of aluminum with the degree of purity of 99.0% or above.

Then, the pulley 300 will be described. The pulley 300 is rotatably supported on one side of the compressor 100 and is connected to an engine of a vehicle through a belt (not shown) wound around an outer side 310 of the pulley to receive rotational force from the engine.

At this time, a cylindrical bearing 350 is installed between the pulley 300 and one side of the compressor 100 to support the load of the pulley 300 and facilitate relative rotation between the pulley 300 and the compressor 100. The bearing 350 includes a cylindrical inner race 360 seated on a periphery of one side of the compressor 100, a cylindrical outer race 370 rotated together with the pulley 300, and balls 380 positioned between the inner race 360 and the outer race 370 to allow relative rotation therebetween.

As seen from FIG. 3, the field coil assembly 200 is housed in the pulley 300. More specifically, the field coil assembly 200 is inserted into a mounting space 330 of the pulley 300, and when power is supplied to the field coil assembly 200, the field coil assembly 200 generates a magnetic flux, so that the disc assembly 400 comes into close contact with the frictional surface 320 of the pulley 300.

Meanwhile, the disc assembly 400 selectively comes into close contact with the pulley 300. The plate-shape disc 410 defines a framework of the disc assembly 400. The disc 410 comes selectively into contact with the frictional surface 320 of the pulley 300 by means of the magnetic flux of the field coil assembly 200 and thus rotated together with the pulley 300.

A damper 420 is installed to the disc 410. The damper 420 absorbs an impact generated when power is transmitted between the pulley 300 and the driving shaft 130. In this embodiment, the damper 420 is formed in a substantially ring shape, but the present invention is not limited thereto. A plurality of dampers 420 may also be intermittently connected on the surface of the disc 410.

A hub 450 is installed to the damper 420. The hub 450 is connected to the driving shaft 130 of the compressor 100 to transmit rotational force of the disc assembly 400 to the driving shaft 130.

This embodiment is illustrated based on a variable capacity compressor in which a slope of the swash plate 148 of the compressor 100 varies, but the present invention is not limited thereto. The present invention may be applied to a fixed capacity compressor in which a slope of the swash 148 is kept constantly.

Hereinafter, the operation of the field coil assembly of an electromagnetic clutch for a compressor according to the present invention will be explained.

First, a driving process of the electromagnetic clutch of the compressor 100 will be described. As the pulley 300 receives rotational force of an engine through a belt and thus rotates, the driving shaft 130 is rotated. Also, in order for the compressor 100 to operate, power should be applied to the field coil assembly 200 and the disc 410 should come into close contact with the frictional surface 320 of the pulley 300.

At this time, since the wire 250 of the field coil assembly 200 is made of aluminum, and the aluminum wire 250 has a greatly lower specific weight than other metal materials with good electric conductivity such as copper, it is possible to make a lighter field coil assembly 200 of an electromagnetic clutch for a compressor.

Meanwhile, if the pulley 300 is rotated by the engine, the rotation of the pulley 300 is transmitted to the driving shaft 130 through the disc 410, the damper 420 and the hub 450. At this time, the pulley 300 is rotatably supported to one side of the front housing 120 by the bearing 350, thereby being rotated smoothly.

Now, a driving process of the compressor 100 will be described. If the driving shaft 130 is rotated, the rotor 140 is rotated together. The rotation of the rotor 140 causes the swash plate 148, which is connected to the hinge arm 146 through the connection arm 149, to rotate.

If the swash plate 148 rotates, the piston 115 connected to the swash plate 148 linearly reciprocates in the cylinder bore 113 while the shoe 150 is fitted at the edge of the swash plate 148. Then, the reciprocating movement of the piston 115 compresses a refrigerant.

The scope of the present invention is not limited to the embodiment described above but is defined by the appended claims. It will be apparent that those skilled in the art can make various modifications and changes thereto within the scope of the invention defined by the claims.

In the present invention, a wire used for a coil is made of aluminum with a small specific weight and low price rather than copper, so that the weight of the field coil assembly is decreased to improve fuel efficiency of a vehicle and decrease a production cost of the field coil assembly.

What is claimed is:

1. A field coil assembly of an electromagnetic clutch for a compressor, the electromagnetic clutch transmitting or cutting off a driving power to the compressor selectively, the field coil assembly generating a magnetic flux to bring a disc assembly into close contact with a pulley when power is applied to the field coil assembly, the field coil assembly comprising:
   a core; and
   a coil installed to the core and formed by winding a unit wire,
   wherein the unit wire is made of aluminum, an area ratio of an inner sectional area of the core to a cross-sectional area of the unit wire is 400 to 640, and the unit wire has a diameter of 0.65 mm to 0.95 mm.

2. The field coil assembly of an electromagnetic clutch for a compressor as claimed in claim 1, wherein the core further comprises therein a bobbin having a terminal at one side thereof, and a fixing cover coupled to the bobbin to support the coil.

3. The field coil assembly of an electromagnetic clutch for a compressor as claimed in claim 1, wherein a bobbin having a terminal provided at one side thereof is provided inside of the core, and the bobbin is molded in the core using epoxy or resin.

4. The field coil assembly of an electromagnetic clutch for a compressor as claimed in claim 1, wherein the aluminum of the unit wire has a degree of purity of 99.0% or above.

* * * * *